United States Patent
Monroy

[11] 3,727,044
[45] Apr. 10, 1973

[54] FIBER OPTICS DECORATIVE ORNAMENT

[75] Inventor: Jeffrey L. Monroy, Santa Ana, Calif.
[73] Assignee: Poly-Optics, Inc., Santa Ana, Calif.
[22] Filed: June 11, 1971
[21] Appl. No.: 152,310

[52] U.S. Cl. ..............................240/10 R, 240/1 EL
[51] Int. Cl. ................................................F21p 1/02
[58] Field of Search.................240/10 R, 10 P, 10 S, 240/10 T, 1 EL

[56] References Cited

UNITED STATES PATENTS

| | | | |
|---|---|---|---|
| 2,016,794 | 10/1935 | Bade et al. | 240/10 P |
| 3,018,362 | 1/1962 | Joyce | 240/10 R |
| 3,431,410 | 3/1969 | Dolan et al. | 240/1 EL X |
| 3,532,874 | 10/1970 | Rosenast | 240/1 E X |
| 3,609,343 | 9/1971 | Howlett | 240/10 R |
| 3,624,385 | 11/1971 | Wall | 240/10 P |

FOREIGN PATENTS OR APPLICATIONS 1,805,786  5/1970  Germany.............................240/1 EL

*Primary Examiner*—Richard C. Queisser
*Assistant Examiner*—Joseph W. Roskos
*Attorney*—Nilsson, Robbins, Wills & Berliner

[57] ABSTRACT

A decorative structure comprising a hollow body enclosing an electric lamp and carrying a spray of optical fibers laterally thereof. The hollow body is formed of separate but matingly-engageable anterior and posterior members, each defining opposing coincident annular surfaces, an opening being formed through the coincident surfaces at the juncture of the anterior and posterior members to receive the bundled ends of an optical fiber spray. In one embodiment, the anterior member is coniform. In another embodiment the anterior member is spheriform and the structure incorporates a plurality of optical fiber sprays.

19 Claims, 6 Drawing Figures

PATENTED APR 10 1973
3,727,044
Fig. 1.
Fig. 2.
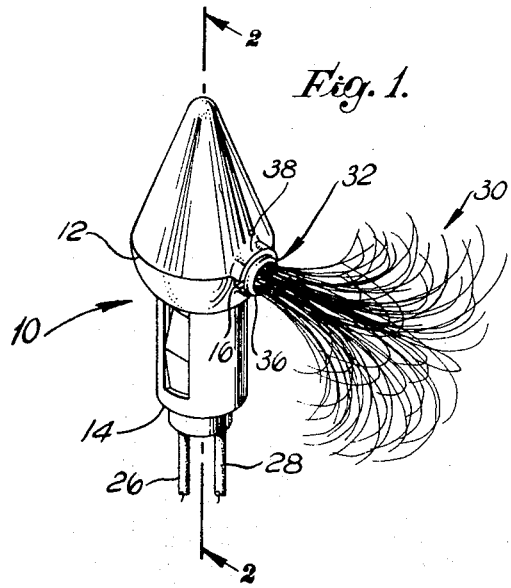
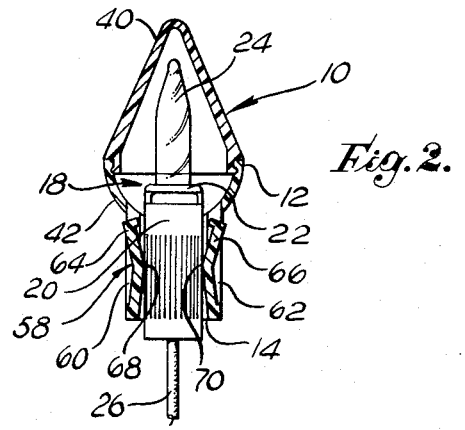
Fig. 4.
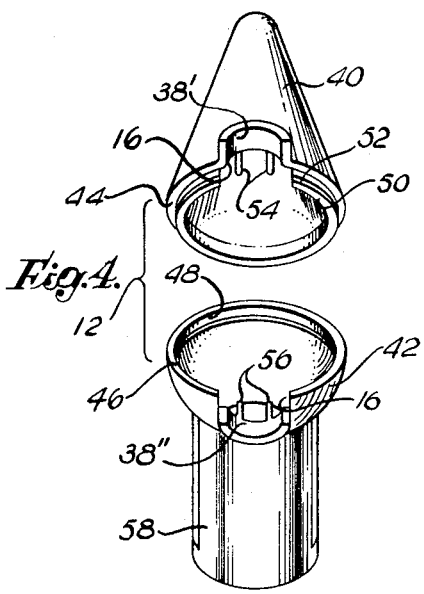
Fig. 5.
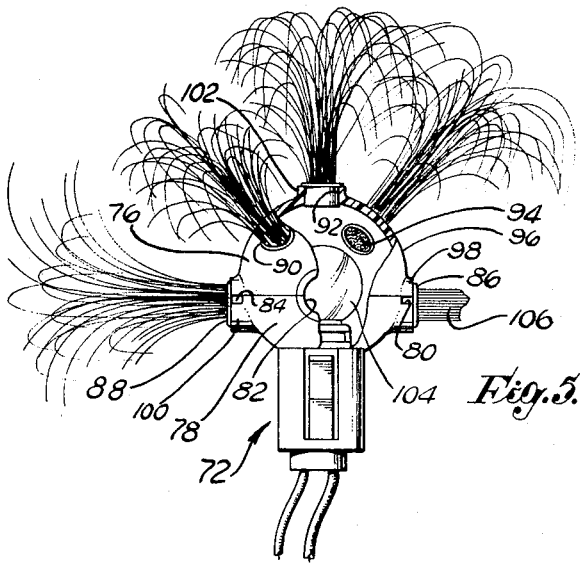
Fig. 3.
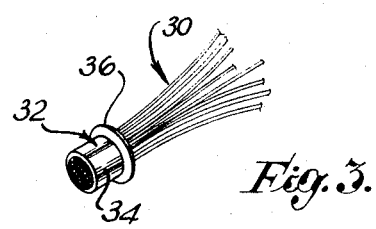
Fig. 6.
INVENTOR.
JEFFREY L. MONROY
BY
NILSSON, ROBBINS, WILLS & BERLINER
ATTORNEYS

FIBER OPTICS DECORATIVE ORNAMENT

FIELD OF THE INVENTION

The fields of art to which the invention pertains include the fields of optics and radiant energy, particularly with respect to light conducting rods, such as optical fibers, and decorative lights including displays and ornaments.

BACKGROUND AND SUMMARY OF THE INVENTION

The advent of modern manufacturing procedures for fabricating plastic as well as glass optical fibers has made such fibers available for decorative purposes. In such utility, the fibers are often bundled together at one end with fibers at the other end unrestrained to flare outwardly forming a spray or bouquet of light. Adapters for such fibers have been developed to connect a fiber spray to a low voltage bulb of the Christmas tree type and to dispose the bundled ends of the spray in close proximity to the bulb. The fiber spray is dispersed in vertical extension so as to jut upwardly from the bulb holder and is illuminated by the top of the enclosed light bulb.

The present invention provides a decorative illumination device in which at least one optical fiber spray is supported so as to jut laterally from a bulb holder and is illuminated by disposing the light receiving bundled ends of the fiber spray adjacent the side of a light bulb. By such means, the fibers can be made to face outwardly toward the viewer yielding optimum light spray effect. The decorative device comprises a hollow body formed with a bottom opening for receiving an electric lamp disposed internally of the body, and a side opening for receiving the bundled light-receiving ends of an optical fiber spray. In particular, the hollow body comprises separate but matingly-engageable anterior and posterior members, the members defining opposing coincident annular surfaces. In one embodiment, the anterior member is coniform from its coincident annular surface and the posterior member is spheriform from its coincident annular surface, the posterior member being formed with a hollow cylindrical dependent neck including means for securing the electric lamp within the body. The side opening is formed through the coincident annular surfaces at the juncture of the anterior and posterior members. A plurality of the holders or adapters can be secured to a string of Christmas tree lights and draped around the tree with the sprays projected outwardly, the adapter allowing 360° rotation of the spray for maximum effect. In another embodiment, the anterior member is spheriform and forms a plurality of openings spaced thereabout for receiving a plurality of optical fiber sprays.

The light receiving ends of the optical fiber spray are bundled by an annular member which is short relative to the length of the fibers which constitute the sole fiber contact support so that the fibers flare unrestrained outwardly from the annular member. The bundling member includes an annular flange spaced from the light receiving fiber ends, the flange having a diameter which exceeds the diameter of the side opening in the housing. The anterior and posterior housing members are formed internally with opposing ribs spaced inwardly from their annular juncture, to guide the positioning of the bundled optical fiber ends.

BRIEF DESCRIPTION OF THE DRAWINGS

FIG. 1 is a perspective view of a fiber optics decorative ornament in accordance with the present invention;

FIG. 2 is a cross-sectional view on line 2—2 of FIG. 1, in the direction of the arrows;

FIG. 3 is a perspective view of the light receiving ends of an optical fiber spray as utilized herein, including a bundling, mounting member;

FIG. 4 is an exploded perspective view of the ornament housing, omitting the electric lamp, wiring and optical fiber spray;

FIG. 5 is a partially cut-away side elevational view of a fiber optics decorative ornament constructed in accordance with an alternative embodiment of the invention; and FIG. 6 is a perspective view of an optical fiber utilized in this invention.

DETAILED DESCRIPTION

As required, detailed illustrative embodiments of the invention are enclosed herein. However, it is to be understood that these embodiments merely exemplify the invention which may take forms substantially different from the specific illustrative embodiments disclosed. Therefore, specific structural and functional details are not to be interpreted as limiting, but simply as a basis for the claims.

Referring to FIGS. 1 and 2, there is shown a decorative ornament 10 which in general form comprises a hollow housing 12 formed with an opening 14 through the bottom thereof and a side opening 16. A miniature or sub-miniature light bulb assembly 18 is disposed through the opening 14 within the housing 12. The assembly 18 includes a husk 20 carrying a socket 22 and miniature bulb 24 therefor, energized via electrical leads 26 and 28 in the usual manner. A spray 30 of a plurality of flexible optical fibers, typically about 80 in number, is bundled with common ends secured in a mounting member 32 which is disposed within the housing opening 16. The fibers flare outwardly from the mounting member 32 so that the outer ends of the fibers constituting the spray 30 are radially directed.

The bulb assembly 18 can be one of a plurality of such bulb assemblies contained on a string of lights as used to drape around a Christmas tree, or for other decorative purpose. The bulb assemblies can be disposed in a vertical manner around the tree utilizing standard securement means as are supplied with a typical string-of-lights set. An ornament 10 can be placed over each of the bulb assemblies causing the fibers to appear at right angles to the vertical disposition of the bulb, facing outwardly toward the viewer. By such means, the viewer is provided with a unique ethereal display of light emitting optical fiber ends. As will become apparent from the following description, the adapter allows 360° rotations so as to allow a maximum effect to be obtained.

Referring additionally to FIG. 3, the mounting member 32 is in the form of a grommet having a hollow cylindrical shank portion 34 and terminating in an annular flange 36. The light receiving ends of the optical fibers 30 are bundled by and disposed within the shank 32 so that the flange 36 is spaced from the light receiving terminal ends of the fibers. The mounting member 32 is short relative to the length of the fibers and constitutes the sole fiber contact support, the unrestrained fibers flaring outwardly therefrom. Referring back to FIG. 1, the housing 12 is formed with an annular protrusion 38 extending outwardly from the opening 16 which serves as a stop for the flange 36, preventing the mounting member 32 from being pushed too close to the bulb 24.

Referring now to FIG. 4 in addition to FIG. 2, the adapter housing 12 is formed of an anterior member 40 and a posterior member 42 which are separate but matingly-engageable along opposing coincident annular surfaces 44 and 46, respectively. The posterior member 42 is formed with an internal annular groove 48 adjacent its top edge. The anterior member 40 is formed with a dependent annular lip 50 which, in turn, is radially formed with an annular ridge 52 for mating engagement in the posterior member groove 48. By such means, the anterior and posterior housing portions 40 and 42 can be snapped together to yield a single structural unit.

The side opening 16 is formed through the housing 12 at the juncture of the anterior and posterior members 40 and 42 so that the protrusion 38 is formed with a top half 38' carried by the anterior member 40 and a bottom half 38" carried by the posterior member 42. This configuration aids in tightly retaining the fiber spray and prevents rotation of the parts. A pair of ribs 54 is formed to extend inwardly from the anterior member edge of the opening 16 and a corresponding pair of ribs 56 is formed to extend inwardly from the posterior member edge of the opening 16 so that when the anterior and posterior members 40 and 42 are snapped together the rib pairs 54 and 56 are disposed on opposite sides of the opening 16 for positioning and retaining the mounting member 32. The ribs 54 and 56 are somewhat tapered toward each other to accommodate manufacturing tolerances of the mounting member 32 and adapter housing 12. As a result of the centering action of the ribs 54 and 56, the light receiving ends of the fibers 30 are disposed adjacent the side of the light bulb 24 in a direct path and in close proximity to the filament of the bulb 24. This feature eliminates the need for internal light reflective surfaces. The surface can be metallized with aluminum or chromium to be reflective, but this is not necessary with the present structure. In fact, as a result of the present construction, the housing can be formed of material having any desired color. While the housing may be of metal, it is advantageously of plastic, a particularly suitable material being white opaque polysulfone. Other plastics such as the polyamides, polycarbonate, polypropylene and/or copolymers and/or special filled plastics or the like, can be used.

Referring again specifically to FIG. 2, it will be seen that the anterior member 40 is coniform and the posterior member 42 is spheriform from their coincident annular surfaces 44 and 46 respectively. The posterior member 42 is formed with a dependent, hollow cylindrical neck 58 through which the bulb assembly 18 is disposed. A pair of slots 60 and 62 are formed vertically through the dependent neck 58 on opposite sides thereof. A pair of finger members 64 and 66 are formed integrally from the neck at the bottom of the slots 60 and 62, respectively, so as to extend vertically within the slots 60 and 62. Each finger member 64 and 66 is formed with an inwardly curved portion having its apex 68 and 70 extending internally of the neck. The finger members 64 and 66 are resiliently deformable from their initial positions and are designed to accommodate and grip a variety of different husk sizes. In this embodiment, the adapter 10 can fit husk sizes from about 0.25 to about 0.38 inches in diameter. The finger members can adapt to the husk as shown or can be secured to the bulb and/or to the socket.

Referring now to FIG. 5, an alternative illumination device 72 is illustrated which has some of the features of the device 10 illustrated in FIGS. 1-4 but which utilizes a plurality of optical fiber sprays. The device 72 includes separable but matingly engageable anterior and posterior portions 76 and 78, the posterior portion 78 having an almost identical construction to the posterior portion 42 of the previously described device 10, except that it is formed with a plurality of openings around the perimeter of its upper annular surface, of which three openings 80, 82 and 84 are indicated in FIG. 5. The anterior portion 76 is formed with corresponding opening halves so that when it is joined with the posterior portions 78 circular openings are provided for disposition therein of optical fiber spray mounting members, such members 86 and 88 illustrated as inserted in openings 80 and 84, respectively.

The anterior member 76 is quite different from the previously described posterior member 40 in that it is spheriform in configuration and is formed with a plurality of openings, of which there can be seen openings 90, 92 and 94 variously positioned about the anterior member 76. Annular protrusions are formed about each opening, as illustrated by the protrusions 98 and 100 and 102 formed about the openings 80, 84 and 92, respectively. Each protrusion forms a seat for a mounting member flange, in accordance with the functioning of the protrusion 38 previously described.

In this embodiment, one utilizes a generally round bulb 104 so that the rays thereof impinge uniformly upon the light receiving ends of each of the sprays secured within the openings in the housing. As a result of this construction, a plurality of sprays 106 are generally evenly distributed around the spherical surface of the adapter housing 72. Each spray includes a plurality of optical fibers, typically about 80 in number, flaring outwardly from its mounting member so that the outer ends of each spray are radially directed. The outer fibers of adjacent sprays meet to present the appearance of a light sphere defined by a multitude of over 700 light points, providing a dramatic ethereal appearance.

Referring to FIG. 6, each optical fiber comprises a central light conducting core 108 encased within a light reflecting jacket 110. The optical fiber is constructed of materials well known to the art wherein the light conducting core 108 has a higher index of refraction than the jacket 110. For example, a core 108 can be formed of polystyrene having an index of refraction of 1.60 and the jacket 110 can be formed of a polymethylmethacrylate having an index of refraction of 1.49. Methods of forming such fibers are well known to the art. For use in the present invention, a balance should be struck between flexibility of the fibers and light emitting capability. The fibers must be sufficiently flexible so as to flare outwardly from their support and yet the fibers should conduct sufficient light to be decoratively aesthetic. To obtain an aesthetically attractive display, one can utilize optical fibers having diameters of 7 mils or more.

I claim

1. A decorative device, comprising:
a hollow body comprising separable, matingly engaged anterior and posterior members, said members defining opposing coincident annular surfaces, said hollow body being formed with at least one side opening through said coincident annular surfaces at the juncture of said anterior and posterior members, and an opening through the bottom thereof;
an electric lamp disposed internally of said hollow body through said bottom opening; and
an optical fiber spray comprising a plurality of flexible optical fibers having light emitting and light receiving ends and means for bundling said light receiving ends, said bundled fiber ends being inserted through said side opening and disposed adjacent said lamp for illumination by said lamp.

2. The invention according to claim 1 in which said hollow body is formed with a dependent neck which defines said bottom opening.

3. The invention according to claim 1 in which said hollow body is formed with a hollow dependent neck defining said bottom opening and including at least one resiliently deformable means protruding internally of said neck to secure said lamp.

4. The invention according to claim 3 in which said neck has an internal generally cylindrical configuration.

5. The invention according to claim 1 including ribs internally of said hollow body on opposing sides of said opening for retaining said bundled fiber ends.

6. The invention according to claim 1 in which said bundling means comprises a member having an annular flange spaced from said light receiving fiber ends and extending radially outwardly from said bundled ends, the diameter of said flange exceeding the diameter of said opening.

7. The invention according to claim 6 including an annular lip around said side opening as a stop for said flange to limit the insertion of said bundled fiber ends to a predetermined extent.

8. The invention according to claim 1 in which said anterior member is coniform.

9. The invention according to claim 1 in which said anterior member is spheriform.

10. The invention according to claim 1 in which said body defines a plurality of openings, each opening formed to receive the bundled light receiving ends of an optical fiber spray.

11. The invention according to claim 1 in which said hollow body is coniform from at least the top of said side opening 12. The invention according to claim 1 in which said bundling means comprises a member short relative to the length of said fibers and said side opening is defined to close-fit said member.

13. The invention according to claim 1 in which said bundling means comprises a member short relative to the length of said fibers and which constitutes the sole fiber contact of said support.

14. The invention according to claim 1 in which said fibers are unrestrained to flare outwardly from said bundling means.

15. The invention according to claim 1 in which said hollow body is opaque.

16. The invention according to claim 1 in which said anterior member is coniform from its coincident annular surface, said posterior member is spheriform from its coincident annular surface, and said posterior member is formed with a hollow cylindrical dependent neck and includes means for securing said lamp within said body.

17. The invention according to claim 16 including opposing ribs spaced inwardly from said annular junction, at least one of said ribs extending anteriorly of said body from each of said anterior and posterior members to position said bundling fiber ends, said bundling means constituting sole fiber contact support and comprising an annular member short relative to the length of said fibers, said fibers being unrestrained to flare outwardly from said bundling means.

18. The invention according to claim 1 in which said anterior and posterior members are each spheriform, from said coincident annular surfaces, said posterior member being formed with a hollow cylindrical dependent neck, including said bottom opening and means for securing said lamp within said body, and said body defines a plurality of openings, including said side opening, each of said openings being formed to receive the bundled light receiving ends of an optical fiber spray.

19. The invention according to claim 18 including ribs on opposite sides of each of said openings and spaced inwardly therefrom to position said bundled fiber ends, said bundling means constituting sole fiber contact support and comprising an annular member short relative to the length of said fibers, said fibers being unrestrained to flare outwardly from said bundling means.

* * * * *